US006761787B2

(12) United States Patent
Schultz

(10) Patent No.: US 6,761,787 B2
(45) Date of Patent: Jul. 13, 2004

(54) METHOD OF CREATING VIRTUALLY SILENT BAG

(76) Inventor: Timothy Schultz, 16732 Bahama St., Northridge, CA (US) 91343

( * ) Notice: Subject to any disclaimer, the term of this patent is extended or adjusted under 35 U.S.C. 154(b) by 84 days.

(21) Appl. No.: 10/147,142

(22) Filed: May 15, 2002

(65) Prior Publication Data

US 2003/0213554 A1 Nov. 20, 2003

(51) Int. Cl.[7] .......................... B29C 53/04; B32B 31/00
(52) U.S. Cl. ....................................... 156/224; 156/281
(58) Field of Search ................................ 156/281, 344, 156/224

(56) References Cited

U.S. PATENT DOCUMENTS 4,137,364 A * 1/1979 Ball et al. .................. 428/412
5,002,806 A * 3/1991 Chung ..................... 427/385.5
5,043,205 A 8/1991 Perazzo et al.
5,301,806 A * 4/1994 Olson ......................... 206/278
5,829,227 A * 11/1998 Derkach et al. .............. 53/412
6,575,626 B1 * 6/2003 Gillespie et al. ........... 383/34.1
6,620,474 B1 * 9/2003 Regnier et al. ............ 428/35.7
2002/0138114 A1 * 9/2002 Gramse ....................... 607/37

* cited by examiner

*Primary Examiner*—Mark A. Osele
(74) *Attorney, Agent, or Firm*—Rob L. Phillips; Quirk & Tratos

(57) ABSTRACT

A bag that is made silent for purposes of using the bag on a studio set in movies, television, and other live and pre-recorded settings, where set props are needed to recreate real life situations for dramatization, but where real life sound that is created by bags interferes with the recording, broadcasting, or amplification of the dramatic performance. The bag is able to maintain real or imaginary brand labels for either product placement or true-to-life dramatization applications.

21 Claims, 3 Drawing Sheets

METHOD OF CREATING VIRTUALLY SILENT BAG

BACKGROUND OF THE INVENTION

This invention relates to a method of transforming a conventional plastic, paper, polymer based or metallic bag into a sufficiently noiseless replica. More particularly, plastic, paper and chip bags are transformed by the present invention such that they generate substantially less noise during handling thereof. Moreover, the method described herein can be used to create a silent bag from scratch without the need for a prefabricated bag "off the shelf."

SUMMARY OF THE INVENTION

Sound stages and drama stages are highly sensitive to sound. These settings are used for the performance and/or filming of dramatic arts. When an actor is on a stage and uses certain material, such as a paper grocery bag or a plastic bag of chips, the noise generated by the bag can overpower the set, disrupt the performance, and create irremediable sound recording problems.

Because of the problems, often noise-generating bags are not often used on stages or in the filming of television and movie performances. Thus, commercials that should feature bags of chips or snacks, or grocery bags, cannot do so without significant sound-related problems.

In addition, if product bags, such as potato and corn chips, cannot be used, manufacturers lose the ability to participate in "product placement." Product placement is where a product is used in a television show or movie as a means of implied endorsement. The products used on a popular television series may greatly benefit by the use of the branded product on television. For example, the use of a particular soda can or bottle in a television show or movie can greatly benefit the soda company in the form of advertising and promotion. Chip and snack companies have been unable to take similar advantage of this phenomena since the noise generated by handling the bags creates the aforementioned set problems. The present invention overcomes the inherent shortcomings of plastic bags and chip bags by rendering them virtually "silent."

DETAILED DESCRIPTION

Figure 1:
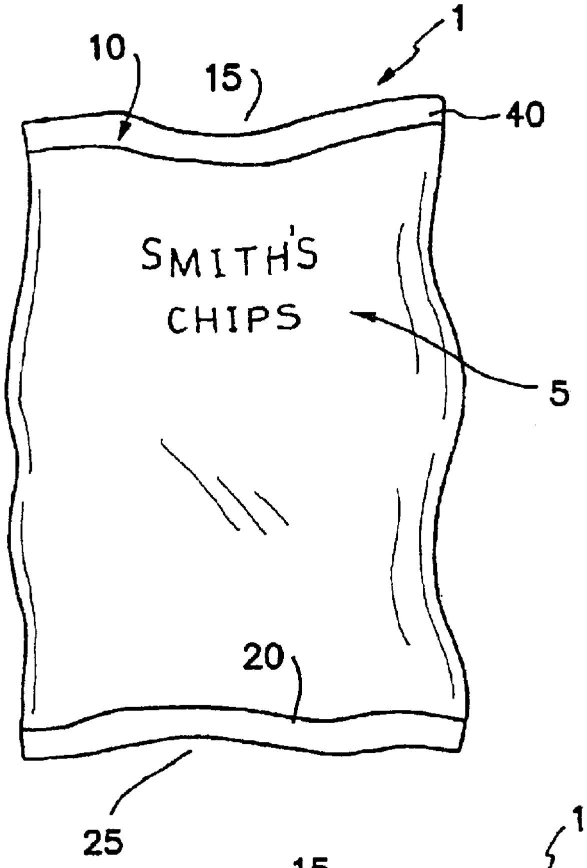
FIG. 1 is a perspective view of a conventional chip bag.
Figure 2:
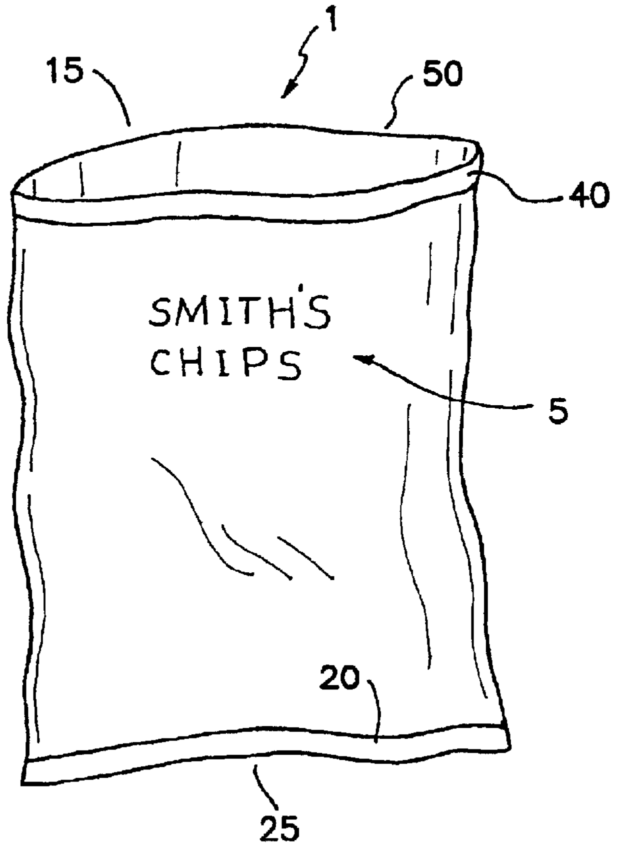
FIG. 2 is a perspective view of the bag opened at a top end.

Referring to FIG. 1, a conventional chip bag 1 being distributed in commerce bears a brand identity 5 and includes a top seal 10 and a bottom seal 20 adjacent the top 15 and bottom 25 of the bag 1 respectively. The present invention can be used for paper or plastic bags, including foilized thin polymer and cellulose acetate, polystyrene, or acrylic bags used for chips or snacks. Most products that are distributed in such bags, including chips and snacks, bear the brand identity 5 of the product. FIG. 2 shows the bag 1 of FIG. 1 opened at the top end 15 as is typically accomplished by pulling the two opposite sides 40, 50 of the top seal 10.

Figure 3:
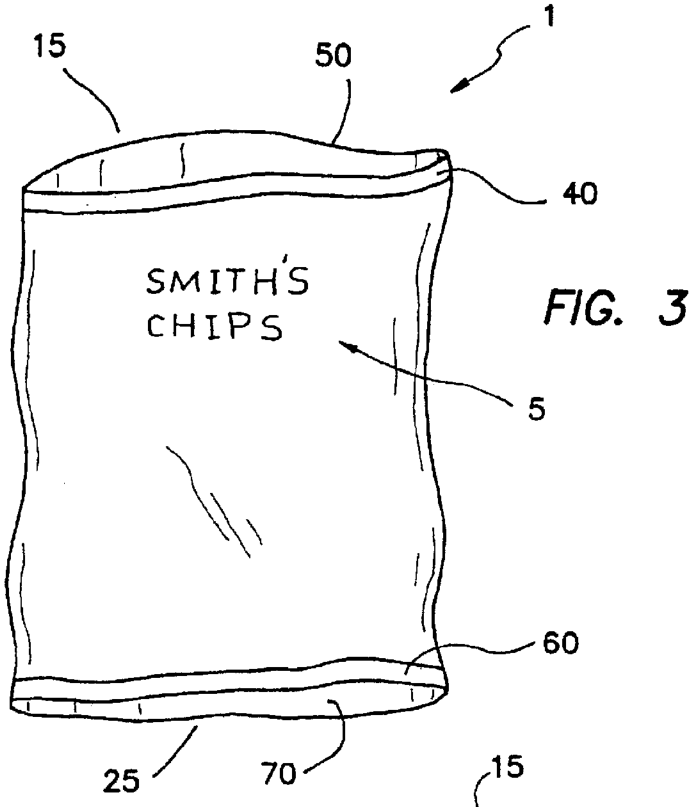
FIG. 3 is a perspective view of the bag opened at both ends.
Figure 4:
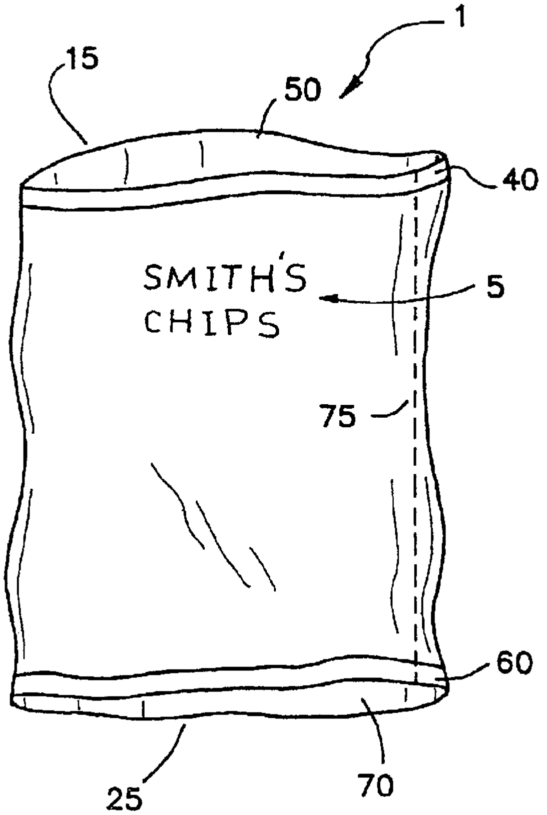
FIG. 4 is a perspective view of the bag with a cut line depicted.
Figure 5:
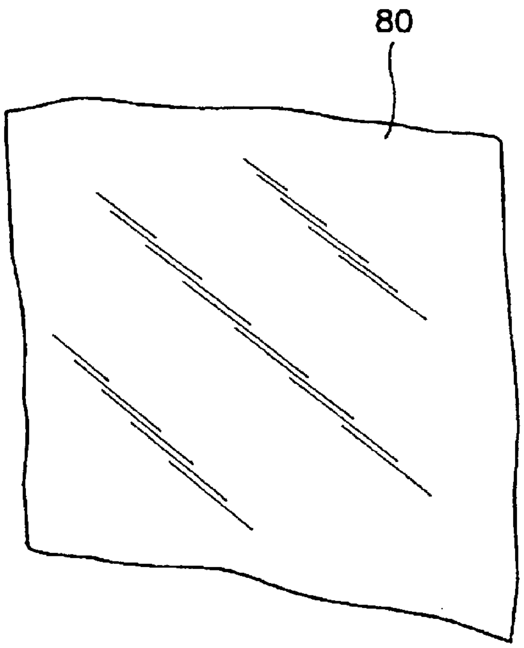
FIG. 5 is a top view of the bag, now a flat sheet, of FIG. 4 after the bag is cut along the line.

Assuming that prefabricated "off the shelf" bags are the subject of the present invention, the bag 1 is first opened at both ends 15, 25 as shown in FIG. 3. Opening the bottom end 25 of the bag may require cutting the bottom 25 of the bag 1 near the bottom seal 20. Alternatively, the bottom 25 may be opened in a manner similar to the top 15 by pulling on the two opposite sides 60, 70 near the bottom seal 20. Since the bottom seal 20 is designed to remain sealed, it may require more delicate handling than opening the top seal 10. The bag 1 is then cut along the line 75 as shown in FIG. 4 creating a flat piece 80 of material as illustrated in FIG. 5. The flat sheet 80 represented in FIG. 5 is also representative of flat sheets initiating a fabrication of a silent bag from scratch, rather than created from an existing prefabricated bag.

Once formed, the flat sheet of material 80 is surface prepared by coating a first side 85 with a solution of cleaner, such as 2-Butoxyethanol and ammonia. Any excess cleaner is then wiped with a cotton towel. The surface preparation is followed by a coating of adhesive on the first side 85. Preferably the adhesive is of a type including cyclohexane, 2-methylpentane, dimethyl ether or similar solutions.

Figure 6:
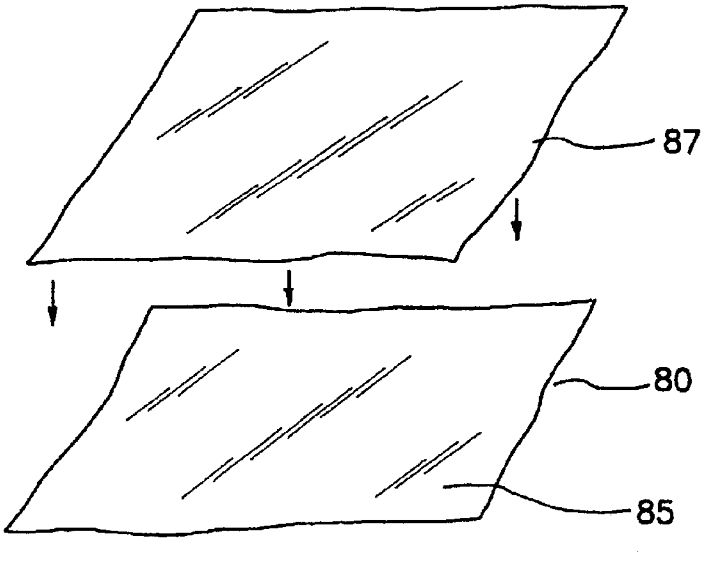
FIG. 6 is a perspective view of the sheeting material in position above the flat sheet, prior to being joined with said flat sheet.

Now referring to FIG. 6, a sheeting material 87 is then applied to the treated adhesive surface of the first side 85. The sheeting material 87 is light-weight, preferably transparent material, such as polyethylene or other laminate material. The sheeting is then rolled with a weighted roller to remove possible air bubbles and to join the treated bag surface and sheeting material permanently. The bag 1 is then left to dry and, once dry, cleaned with naphtha or other similar solvent to remove any excess glue. The bag 1 is then essentially re-constructed by using a sealer to re-seal the bottom 25 of the bag 1 and additionally the side 75 must be re-sealed to re-create the appearance of a conventional bag. If required, the top of the bag 15 may be re-sealed as well.

A custom made bag is constructed in the same manner as described from the point of the flat sheet of material which is treated and formed into a bag by means of a sealer.

The finished bag is now virtually silent. Whereas an average chip bag creates noise in excess of 72 to 80 db in a quite room or sound studio with a silent reading of 42 db, the silent bag creates 45 db under the same circumstances.

Moreover, many of the applications for the invention are in circumstances where the labeling of the bag must be preserved for product placement or brand recognition. With a clear sheeting overlay, the silent bag that is created with the methods of the present invention will preserve the original label or other desired custom labeling.

Numerous variations and modifications are possible within the spirit and scope of the invention, which should be limited only by the claims herein.

I claim:

1. A method for treating a bag such that noise created by handling the bag is reduced:

forming the bag into a flat sheet;

treating at least a first surface of the flat sheet with a cleaner;

removing said cleaner;

applying an adhesive to the at least first surface;

applying a sheeting material to the at least first surface;

applying pressure to the sheeting material to permanently join the sheeting material to the at least first surface;

removing excess adhesive; and re-forming the flat sheet into a bag.

2. The method of claim 1 wherein said cleaner is a combination of 2-butoxyethanol and ammonia.

3. The method of claim 1 wherein said adhesive is selected from the group consisting of cyclohexane, 2-methylpentane and dimethyl ether.

4. The method of claim 1 wherein said pressure is applied by rolling a weighted roller over the adhesive and flat sheet.

5. The method of claim 1 wherein said sheeting material is lightweight and transparent.

6. The method of claim 1 wherein the sheeting material is polyethylene.

7. The method of claim 1 wherein excessive adhesive is removed by applying a solvent.

8. The method of claim 7 wherein said solvent is naphtha.

9. A method for creating a bag having reduced noise properties comprising the steps of:

forming a bag material into a flat rectangular sheet;

treating at least a first surface of the flat sheet with a combination of 2-butoxyethanol and ammonia;

removing said combination of 2-butoxyethanol and ammonia;

applying an adhesive to the at least first surface;

applying a sheeting material to the at least first surface;

applying pressure to the sheeting material to permanently join the sheeting material to the at least first surface;

removing excess adhesive; and forming the flat sheet into a bag.

10. The method of claim 9 wherein said pressure is applied by rolling a weighted roller over the adhesive and flat sheet.

11. The method of claim 9 wherein said sheeting material is lightweight and transparent.

12. The method of claim 9 wherein the sheeting material is polyethylene.

13. The method of claim 9 wherein excessive adhesive is removed by applying a solvent.

14. The method of claim 13 wherein said solvent is naphtha.

15. A method for creating a bag having reduced noise properties comprising the steps of:

forming a bag material into a flat rectangular sheet;

treating at least a first surface of the flat sheet with a cleaner;

removing said cleaner;

applying an adhesive, wherein said adhesive is selected from the group consisting of cyclohexane, 2-methylpentane and dimethyl ether, to the at least first surface;

applying a sheeting material to the at least first surface;

applying pressure to the sheeting material to permanently join the sheeting material to the at least first surface;

removing excess adhesive; and forming the flat sheet into a bag.

16. The method of claim 15 wherein said pressure is applied by rolling a weighted roller over the adhesive and flat sheet.

17. The method of claim 15 wherein said sheeting material is lightweight and transparent.

18. The method of claim 15 wherein the sheeting material is polyethylene.

19. The method of claim 15 wherein excessive adhesive is removed by applying a solvent.

20. The method of claim 19 wherein said solvent is naphtha.

21. The method of claim 15 wherein said cleaner is a combination of 2-butoxyethanol and ammonia.

* * * * *